United States Patent [19]

Beall et al.

[11] Patent Number: 5,132,256
[45] Date of Patent: Jul. 21, 1992

[54] FIBER-REINFORCED COMPOSITE COMPRISING MICA-DOPED CERAMIC MATRIX

[75] Inventors: George H. Beall, Big Flats; Kenneth Chyung, Painted Post; Kishor P. Gadkaree, Big Flats, all of N.Y.

[73] Assignee: Corning Incorporated, Corning, N.Y.

[21] Appl. No.: 674,891

[22] Filed: Mar. 26, 1991

[51] Int. Cl.⁵ .............................................. C04B 35/02
[52] U.S. Cl. ........................................ 501/95; 501/3; 501/32; 501/89
[58] Field of Search .......................... 501/95, 3, 32, 89

[56] References Cited

U.S. PATENT DOCUMENTS

| | | | |
|---|---|---|---|
| 4,919,991 | 4/1990 | Gadkaree | 428/113 |
| 4,935,387 | 6/1990 | Beall et al. | 501/3 |
| 4,948,758 | 8/1990 | Beall et al. | 501/3 |

Primary Examiner—William R. Dixon, Jr.
Assistant Examiner—Chris Gallo
Attorney, Agent, or Firm—Kees van der Sterre

[57] ABSTRACT

Ceramic matrix composite articles of improved high temperature oxidation resistance are provided, the articles comprising reinforcing fibers disposed within a ceramic matrix, the matrix further comprising a minor matrix addition consisting of a dispersion of fluormica crystallites in a proportion effective to improve the oxidation resistance of the article and ranging up to about 20% by weight of the matrix.

14 Claims, No Drawings

FIBER-REINFORCED COMPOSITE COMPRISING MICA-DOPED CERAMIC MATRIX

BACKGROUND OF THE INVENTION

The present invention relates generally to ceramic matrix composites, and more particularly to ceramic matrix composites reinforced with inorganic fibers and wherein the matrix incorporates an addition of dispersed mica crystals.

The use of inorganic whiskers and fibers to reinforce glasses, glass-ceramics, and ceramics has long been practiced. The mechanism of strengthening of glass or ceramic bodies by fibers is considered to be that of load transfer by the matrix to the fibers through shear. This load transfer shifts stress from the glass or ceramic matrix to the relatively long, high modulus fibers, while the fibers at the same time may act to impede crack propagation in the matrix material. Whiskers are thought to impart strengthening by a similar mechanism, but load transfer to whiskers by the matrix is more limited due to the limited length and aspect ratio of the whiskers.

Among the fibers and whiskers which have been suggested for use as reinforcements for inorganic matrix materials are silicon carbide, silicon nitride, alumina and carbon whiskers. For example, U.S. Pat. No. 4,324,843 describes SiC fiber reinforced glass-ceramic composite bodies wherein the glass-ceramic matrix is of aluminosilicate composition. U.S. Pat. No. 4,464,475 describes similarly reinforced glass-ceramics comprising barium osumilite as the predominant crystal phase, while U.S. Pat. No. 4,464,192 describes whisker-reinforced glass-ceramic composites of aluminosilicate composition.

A principal objective of whisker reinforcement in glass, ceramic and glass-ceramic materials for high temperature applications is that of increasing the toughness of the material. A toughened ceramic material exhibits improved resistance to cracking failure from flaws sustained in use, offering the possibility of increased fatigue lifetime. As noted in U.S. Pat. No. 4,626,515, the addition of fiber reinforcement to glasses such as alkali-free alkaline earth aluminosilicate glasses can result in substantial strengthening, while whisker additions to those glasses were found effective to enhance the toughness of the glass. Composites comprising glass-ceramic matrix materials and incorporating both fiber reinforcement and whisker toughening agents (referred to as hybrid composites) are described in U.S. Pat. No. 4,651,987.

The addition of certain particulate materials to ceramic matrix composite systems, to serve as toughening agents for the matrix in preference to whisker additions, is described in U.S. Pat. No. 4,919,991. As noted in that patent, matrix additives such as silicon carbide particulates were found effective to improve properties such as transverse and interlaminar shear strength in glass-ceramic matrix composites comprising layered fiber reinforcement.

U.S. Pat. No. 4,935,387 describes the first use of mica materials as functional components of ceramic matrix composite structures. That patent shows that, in a fiber-reinforced ceramic composite structure, the presence of at least a thin layer of mica adjacent to the fibers in the composite imparts tough fracture behavior to the system. This effect was attributed to the ability of the mica to furnish a weak oxide fiber/matrix interface in the material which facilitated fiber pullout from the matrix. Good pullout performance was observed even at temperatures sufficiently high to produce fiber adhesion and/or embrittlement, and thus brittle composite fracture behavior, in similar composites not incorporating the mica.

One of fiber materials which has frequently been used for the reinforcement of ceramic matrix composites such as above described is silicon carbide fiber. Commercially available forms of this fiber, most commonly silicon oxycarbide fiber sold as Nicalon fiber, has been widely studied as a reinforcement fiber for glass-ceramic composites based on anorthite (calcium aluminosilicate) cordierite (magnesium aluminosilicate), spodumene (lithium aluminosilicate), and many other alkali and alkaline earth silicate systems.

Although silicon carbide fibers provide composites which are quite strong and tough at moderately elevated temperatures (eg., 600° C.), reductions in failure stresses and strains to less than 50% of room temperature values can be observed at higher temperatures (eg., 1000° C.). This strength decline is attributed to the oxidation of a weak graphitic interface layer, formed on the silicon oxycarbide fibers as an incident to the normal composite consolidation process. The fiber pullout characteristics of this layer, which are essential to the strength and toughness of these fiber composites, are lost through rapid layer oxidation at high temperatures resulting from air penetration through microcracks in the ceramic matrix.

Several approaches to the solution of this problem are have been studied. Most recently, as noted in U.S. Pat. No. 4,935,387 above and in U.S. Pat. No. 4,948,758, tetrasilicic fluormica and other mica matrix and coating systems have been evaluated as a means of providing a weak oxide interface which should be more oxidation resistant than a carbon interface. However, although this approach provides composites showing fibrous fractures at 1000° C., the strength of these composites is relatively low (40 to 50 Ksi at 25° C. and 1000° C.) due to low shear strength of the mica matrix which is controlled by the weak cleavage strength. Also, the need to use coated fibers adds complexity to the manufacturing process, and thus increases the cost of the products.

Accordingly, it is a principal object of the present invention to provide silicon-carbide-fiber-reinforced ceramic composites offering improved strength retention at elevated temperatures.

It is a further object of the invention to provide silicon carbide-reinforced ceramic composites offering improved resistance to oxidative embrittlement, and a method for making them which does not require the coating for the silicon carbide reinforcing fibers.

Other objects and advantages of the invention will become apparent from the following description thereof.

SUMMARY OF THE INVENTION

The present invention is founded in part on a new conception of the role which crack deflection could play in reducing access by oxygen or other oxidants to oxidizable fibers or fiber components in ceramic matrix composites. Without intending to be limited to any particular theory or mode of operation for the invention, the incorporation into a ceramic matrix material of fine platelets having the capability of deflecting microcracks at the platelet/matrix interface could effectively operate to delay or prevent the approach of cracks into the fiber/matrix interface region. If operative, this effect could result in improved strength retention by the fiber-reinforced material at elevated temperatures.

We have now discovered that the incorporation of platelets in the form of mica crystallites into a ceramic matrix material such as a glass-ceramic can produce a significant improvement in the oxidation resistance of a fiber-reinforced composite comprising the platelet-containing matrix. Hence, regardless of the mode of operation, the platelet addition results in markedly improved composite flexural strength at high temperatures.

In a first aspect, then, the invention comprises a ceramic matrix composite article comprising reinforcing fibers such as silicon carbide fibers disposed within a ceramic matrix, characterized in that the ceramic matrix contains dispersed mica crystallites in a proportion ranging up to but not exceeding about 20% by weight. A concentration of mica crystallites in the range of about 2-20 percent by weight of the matrix appears to impart good oxidation protection without unacceptably reducing the refractoriness and room temperature strength of the composite.

In another aspect, the invention includes a method for improving the high temperature oxidation resistance of a ceramic matrix composite article comprising reinforcing fibers disposed within the matrix, that method comprising the step of incorporating a dispersion of mica crystallites into the ceramic matrix in a proportion at least effective to improve the high temperature flexural strength of the composite.

While strength improvements in accordance with the invention are believed to be attainable with any fiber reinforcement system wherein the fibers are subject to oxidative deterioration, the invention has particular application to fiber-reinforced composites wherein silicon carbide fibers, most typically silicon oxycarbide fibers, constitute some or all of the fiber reinforcement provided.

DETAILED DESCRIPTION

Achieving improvements in high temperature composite performance in accordance with the invention is not believed to depend critically upon the chemical composition of the mica crystallites used. We expect that any non-hydroxyl mica obtainable in a reasonably small crystallite size (ie., not exceeding about 500 microns, more preferably not exceeding about 50 microns) should provide useful improvements in oxidation protection, provided only that the crystals are sufficiently refractory and resistant to attack by the matrix ceramic during consolidation to survive as a platelet dispersion through the high temperature consolidation steps used in composite manufacture.

The particularly preferred micas for use in accordance with the invention, however, are the synthetic fluormicas, most preferably synthetic micas prepared by crystallization from glasses and therefore being of controlled composition and crystallite size. U.S. Pat. Nos. 3,689,293, 3,732,087 and 3,756,838 disclose the synthesis of mica-containing glass-ceramics from crystallizable glasses, while U.S. Pat. No. 4,239,519 discloses similar glass-ceramics which can be water-treated to yield mica sols or gels.

Among the mica types or so-called sheet silicates which can be produced in crystallizable glasses in accordance with these patents are the fluorphlogopite micas, including normal, boron, and subpotassic fluorphlogopites (U.S. Pat. No. 3,689,293), trisilicic alkaline earth fluormicas (having the formula $R_{0.5-1}Mg_{1.0-2.5}(AlSi_3O_{10})F_2$ wherein R is an alkaline earth metal selected from the group consisting of Ba and Sr, as disclosed in U.S. Pat. No. 3,756,838), and the tetrasilicic fluormicas (having the formula $X_3Mg_{2.5}Si_4O_{10}F_2$ wherein X is K, Rb, Cs, Sr, Ba or Cd, as disclosed in U.S. Pat. No. 3,732,087). Disilicic fluormicas of the formula $RMg_3(Al_2Si_2O_{10})F_2$, wherein R is a cation selected from the group consisting of Ba, Sr and Ca, are also useful, these being well known and readily manufacturable through the crystallization of inorganic fluoride melts.

From among these various sheet silicates, the tetrasilicic sheet silicates such as fluorotalc and fluoropyrophillite and the disilicic fluromicas wherein the predominant interlayer cation is selected from the group consisting of Ba, Ca, and Sr are generally preferred for use as the matrix additive. Such use is particularly advantageous when high refractoriness in the composite product is a key requirement.

Although a variety of glass and glass-ceramic materials could be utilized to provide the matrix of a composite article provided according to the invention, the preferred materials will be selected from the group consisting of aluminosilicate glasses and alkaline earth aluminosilicate glass-ceramics. Most preferably, the matrix will be an alkaline earth aluminosilicate glass-ceramic wherein the alkaline earth oxide is selected from the group consisting of BaO, CaO, SrO and MgO and wherein a crystalline species selected from the group consisting of anorthite, mixed anorthite/alumina, celsian, cordierite and stuffed cordierite comprises the predominant crystal phase. By a predominant crystal phase is meant a crystal phase or phase group predominating in the glass-ceramic component of the glass-ceramic/additive matrix, i.e., constituting more than 50% by volume of the glass-ceramic component, exclusive of the mica additive.

These glass-ceramic compositions are well known from the patent literature. Glass-ceramics having a predominant crystal phase selected from the group consisting of anorthite (triclinic $CaO \cdot Al_2O_3 \cdot 2SiO_2$) and anorthite pseudo-binaries with mullite ($3Al_2O_3 \cdot SiO_2$), cordierite ($2MgO \cdot 2Al_2O_3 \cdot 5SiO_2$), barium osumilite ($BaO \cdot 2MgO \cdot 3Al_2O_3 \cdot 9SiO_2$), and stuffed cordierite (eg., cordierite stuffed with an ion selected from the group consisting of Sr, Ba, Cs or K) have been used for composite fabrication and are shown in U.S. Pat. No. 4,615,987. They typically have a composition within the following ranges, as defined in weight percent on the oxide basis:

| CaO | 0–25 | MgO | 0–15 |
|---|---|---|---|
| SrO | 0–30 | Na$_2$O | 0–4 |
| BaO | 0–45 | K$_2$O | 0–6 |
| Al$_2$O$_3$ | 25–38 | TiO$_2$ | 0–12 |
| SiO$_2$ | 35–60 | ZrO$_2$ | 0–15 |
| CaO + BaO + SrO | 10–45 | As$_2$O$_3$ | 0–3 |
| Na$_2$O + K$_2$O + TiO$_2$ + ZrO$_2$ + As$_2$O$_3$ | | | 0–15 |

Compositionally related glass-ceramics, also preferred for composite fabrication in accordance with the invention, are those containing anorthite with excess Al$_2$O$_3$ and wherein the predominant crystal phase comprises anorthite in combination with at least one of mullite and alpha alumina. Disclosed in U.S. Pat. No. 4,755,489, these glass-ceramics typically have compositions within the range of about 16-20% CaO, 38.5-46% $Al_2O_3$, 35-42% $SiO_2$, 0.25-1.5% $As_2O_3$, and up to 10% total of at least one nucleating agent selected in the indicated proportion from the group consisting of 0.1-3% $Cr_2O_3$, 0.25-3% $HfO_2$, 2-5% $MoO_3$, 0.25-3% $Nb_2O_5$, 0.25-3% $Ta_2O_5$, 0.25-3% $WO_3$, and 1-10% $ZrO_2$. The compositions are generally substantially free of $TiO_2$ and contain $Al_2O_3$ in an amount which is at least 10 mole percent and up to 50 mole percent in excess of that present in stoichiometric triclinic anorthite.

As is known from U.S. Pat. No. 4,485,179, $Nb_2O_5$ and/or $Ta_2O_5$ may be useful in ceramic matrix composites not only as nucleating agents but also to protect SiC fibers from deterioration in use. Therefore, matrix glass-ceramics in accordance with the invention may in some cases contain these oxides as additional constituents, typically in amounts not exceeding 1-10% total of $Ta_2O_5$ or $Nb_2O_5$.

Similarly, the inclusion of 0.5-3% $As_2O_3$ can be useful in these matrices to help to protect the fibers from oxidation.

Specific examples of compositions for glass-ceramic matrix materials suitable for use in accordance with the invention are reported in Table I below. Examples A and B of Table I represent glass compositions which are thermally crystallizable to barium-stuffed cordierite as the predominant crystal phase, while compositions C and D form barium osumilite and compositions E and F form anorthite/cordierite mixtures as predominant crystal phases. Compositions G and H represent glasses which are thermally crystallizable to glass-ceramic materials wherein the predominant crystal phase is triclinic anorthite in solid solution with one or both of mullite and/or alumina. Compositions reported in Table I are given in weight percent as calculated from the batch.

TABLE I

|  | A | B | C | D | E | F | G | H |
|---|---|---|---|---|---|---|---|---|
| $SiO_2$ | 42.4 | 43.66 | 50.63 | 53.2 | 45.6 | 48.1 | 35.4 | 40.8 |
| $Al_2O_3$ | 36.0 | 37.11 | 27.66 | 25.0 | 36.2 | 35.6 | 45.0 | 39.7 |
| CaO | — | — | — | 14.1 | 8.1 | 16.5 | 19.0 | — |
| BaO | 6.0 | 6.20 | 13.27 | 12.5 | — | — | — | — |
| MgO | 12.6 | 13.03 | 3.44 | 8.4 | 4.4 | 8.3 | — | — |
| $As_2O_3$ | 0.68 | 0.70 | 1.0 | 1.0 | 0.5 | 0.5 | 0.05 | 0.5 |
| $ZrO_2$ | 3.0 | — | — | — | — | — | 3.0 | — |
| $Cr_2O_3$ | — | — | — | — | — | — | — | 0.1 |

The fabrication process most frequently used for ceramic composite fabrication utilizes the matrix and any particulate additive thereto in the form of finely divided powders. Most preferably the matrix is provided as a powder of a crystallizable glass, which powder can be prepared by essentially any technique which will produce complete pulverization with a uniform particle size.

A preferred powder-forming procedure for the matrix material is to produce coarse powdered glass by a technique such as dry-gaging, and then to mill the powdered glass, as by ball-milling, to produce very fine, uniform powder. Preferably the milled glass particles will not exceed 325 mesh (U. S. Sieve) in size, and will have an average particle size not exceeding 50 microns.

In contrast to the case of the matrix, the mica platelets constituting the matrix additive are best incorporated as fully crystallized material, rather than in the form of amorphous glass or another mica precursor material. In the case of the synthetic fluormicas, the desired platelets can conveniently be produced from mica glass-ceramics by pulverization of the fully crystallized glass-ceramic material.

For these synthetic micas, the size of the mica platelets can be controlled by the glass-ceramic crystallization heat treatment, and can be further adjusted by supplemental milling, as needed, in order to provide a particle size appropriate for the particular composite system being manufactured. The appropriately sized mica crystallites can then simply be introduced as a powder additive into the matrix glass powder, and the powder mixture then combined with the selected reinforcing fibers by conventional processing.

The fibers used for composite reinforcement in accordance with the invention may be selected from among any of the fibers known for use as ceramic matrix reinforcement fibers, if such fibers would benefit from the oxidation protection afforded by the mica additions in accordance with the invention. Examples of such fibers include silicon carbide or oxycarbide fibers as well as carbon, $B_4C$, BN or silicon nitride or oxynitride fibers.

The particularly preferred fiber reinforcement material for present purposes will be selected from the group consisting of silicon carbide fiber and silicon oxycarbide fiber. These fibers, and especially silicon oxycarbide fibers, are known to develop a functional interface during ceramic composite consolidation which significantly enhances the toughness of the composite material.

Alternative fiber materials can also impart good toughness to a ceramic composite, particularly when used in combination with an artificially applied functional interface such as a carbon, carbide or nitride coating. And, where the applied coating is subject to high temperature oxidative deterioration, similar performance advantages from the use of mica additions in accordance with the invention are anticipated.

Silicon oxycarbide fiber is readily available commercially as Nicalon ® fiber in the form of continuous fiber tow or yarn which may be conveniently impregnated with the selected matrix material and formed by winding or the like into fiber-reinforced prepreg sheet. The resulting sheets may then be stacked, heated to achieve burnout of any organic constituents, and finally treated to effect consolidation and crystallization thereof into a dense, substantially void-free glass-ceramic matrix composite material. Consolidation may be achieved by sintering, hot pressing, hot isostatic pressing, or similar known consolidation procedures.

The final properties of the particular fiber-reinforced ceramic matrix composites provided in accordance with the above-described procedures will of course depend upon a number of control variables. Such variables include the composition of the matrix, the composition and size of the mica platelets present in the matrix, the proportion of mica additive used, and the relative compatibility of the platelets and the matrix glass-ceramic. Nevertheless, excellent room temperature strength and strength retention under high temperature oxidizing conditions are readily achievable by routine optimization of these variables within the scope of the invention as hereinabove described.

The following examples, which are intended to be illustrative rather than limiting, further demonstrate the fabrication of ceramic matrix composite articles in accordance with the invention, and compare such articles to a prior art composite.

EXAMPLES 1-5

An alkaline earth aluminosilicate glass, thermally crystallizable to yield an anorthite-alumina mixture as the predominant crystal phase, is selected for use as a composite matrix material. The glass has a composition, in weight percent on the oxide basis, of about 16.5% CaO, 45% $Al_2O_3$, 35.4% $SiO_2$, 3% $ZrO_2$ and 0.5% $As_2O_3$. Glass powder for the matrix is produced from a melt of this composition by dry-gaging the melt and then milling the dry-gage to an average particle size of about 10μm.

A mica powder consisting predominantly of synthetic fluormica crystals is next prepared by crystallization and pulverization of a selected mica precursor glass. The glass has a batch composition, in weight percent, of about 58.6% $SiO_2$, 13.4% MgO, 17.3% $MgF_2$, 1.0% $As_2O_3$, and 11.5% $K_2O$, the molten glass being cast from a crucible melt to form a glass patty which is then annealed and finally thermally crystallized at 800° C. for 4 hours to convert it to a highly crystalline glass-ceramic comprising a tetrasilicic fluormica ($K_3Mg_{2.5}Si_4O_{10}F_2$) crystals as the predominant phase. The glass-ceramic patty is then crushed and milled to provide a tetrasilicic fluormica powder having an average particle size of about 10 microns.

To fabricate ceramic matrix composites comprising this mica matrix additive, mica powder additions in proportions ranging from about 5-20% by weight are made to samples of the aluminosilicate glass matrix powder, the resulting powder mixtures then being thoroughly blended in an isopropanol vehicle in a Waring blender for 5 minutes, separated from the vehicle by filtration, and dried.

Each mixed powder batch thus provided is then used to prepare prepregs comprising powder-encased silicon oxycarbide fibers. Each batch is first dispersed in an aqueous slurry comprising a Rhoplex acrylic binder, and fibers in the form of Nicalon. fiber tow are transported through the slurry to infiltrate the tow with the powder. The powder-impregnated tow is then collected on a drum to provide a continuous winding, dried, and then cut from the drum in the form of prepreg mat.

Prepreg mat thus provided is next stacked to provide composite preforms several layers thick, and the stacks are then subjected to a binder burnout heat treatment in air at about 450° C., followed by a hot-press consolidation treatment in graphite dies under nitrogen at temperatures in the range of about 1200-1340 ° C. The products of consolidation are dense, substantially void-free ceramic matrix composite bars.

The ceramic matrix composite bars thus provided are next subjected, along with similar bars comprising a mica-free matrix but otherwise of identical composition and process history, to flexural testing in 4-point bending. Flexural testing is carried out at ambient temperature (25° C.) and at elevated temperatures ih the range of 1000-1200 ° C. These tests determine the strength and resistance to oxidative deterioration of the composite samples.

Table II below reports the results of the flexural testing of the composites, both at ambient and at elevated test temperatures, as functions of the concentration of the mica platelets (Mica-%) in the ceramic matrix and of the hot press temperature (HP Temp.) used for the consolidation of each composite. Included in Table II for each of the matrix compositions and test temperatures reported are the range of values recorded for the microcrack yield stress ($\sigma_{MCY}$) and strain ($\epsilon_{MCY}$) of the samples, in Ksi and %, respectively, which are the stress and strain (sample elongation) values recorded at the first appearance of microcracking in the mica-doped matrix material. Also included are the ranges of ultimate stress ($\sigma_{ULT}$) and ultimate strain ($\epsilon_{ULT}$), in Ksi and %, respectively, recorded at the point of ultimate flexural failure of the samples. Composite Example 1 contained no mica in the matrix, while Examples 2-5 contained 5-20% by weight of the tetrasilicic fluormica additive.

TABLE II

| Example No./HP Temp. (°C.) | Mica (%) | Flex Test Temp. (°C.) | $\sigma_{MCY}$ (Ksi) | $\epsilon_{MCY}$ (%) | $\sigma_{ULT}$ (Ksi) | $\epsilon_{ULT}$ (%) |
|---|---|---|---|---|---|---|
| 1/ 1340° | 0 | 25 | 30-39 | 0.17-0.22 | 110-120 | 1.0-1.2 |
| | | 1000 | 35 | 0.2 | 40-45 | 0.3-0.4 |
| | | 1200 | 22-34 | 0.22-0.34 | 46-51 | 0.49-0.55 |
| 2/ 1220° | 5 | 25 | 22.5 | 0.14 | 85 | 0.77 |
| | | 1000 | 16 | 0.16 | 65 | 0.87 |
| | | 1200 | 0.1 | 0.00 | 1.1 | 0.11 |
| 3/ 1220° | 10 | 25 | 34 | 0.19 | 111 | 0.85 |
| | | 1000 | 50 | 0.48 | 80 | 0.80 |
| | | 1200 | 2.1 | 0.03 | 4.8 | 0.49 |
| 4/ 1207° | 15 | 25 | 41 | 0.24 | 85 | 0.77 |
| | | 1000 | 22 | 0.19 | 65 | 0.87 |
| | | 1200 | 4.7 | 0.07 | 1.1 | 0.11 |
| 5/ 1207° | 20 | 25 | 28 | 0.18 | 74 | 0.59 |
| | | 1000 | 28 | 0.28 | 58 | 0.63 |
| | | 1200 | 0.3 | 0.02 | 0.90 | 0.04 |

As shown by the data in Table II, the room temperature as well as the high temperature (1000° C.) ultimate strengths and failure strains of the samples increase as the level of mica additions to the matrix is increased from 5 wt % to 10 wt %. The strengths obtained at the 10 wt % doping level are 111 Ksi and 80 Ksi, respectively, at 25° C. and 1000° C.

In the sample comprising the unmodified ceramic matrix, the high ambient temperature strengths (110-120 Ksi) are observed to deteriorate significantly to values in the range of 40-45 Ksi, with ultimate failure strains being only on the order of 0.3-0.4%. These results are attributed to the substantial level of fiber embrittlement which occurs in the unmodified matrix composite at the higher test temperatures employed.

As these data suggest, doping the matrix with mica crystals substantially enhances the ultimate flexural strengths and elongations of the composites. And, although as the doping level is increased to 15-20% by weight of mica in Examples 4 and 5, some decline in ultimate properties is observed, the ultimate properties of the doped composites still substantially exceed those of the unmodified material.

While excellent improvements in strength retention at 1000° C. are achieved through the addition of a tetrasilicic fluormica matrix additive or modifier in accordance with Examples 2-5 above, somewhat better flexural performance at 1200° C. would be desirable. Such improvements can in fact be achieved by utilizing more refractory mica crystals as matrix additives, and the following further examples of the fabrication of mica-doped composites in accordance with the invention illustrate such use.

EXAMPLES 6-11

The fabrication procedure used to produce the mica-containing ceramic matrix composites of Examples 2-5 above is repeated, except that a more refractory barium disilicic mica is selected as the matrix additive for the composite product. As in Examples 2-5, the barium disilicic fluormica crystals are prepared through the crystallization and pulverization of a mica precursor melt, the melt in this case having a composition, in weight percent, of about 23.2% $SiO_2$, 19.7% $Al_2O_3$, 14.5% MgO, 13.6% $MgF_2$, and 29.6% BaO.

A batch of the described composition is first melted in a platinum crucible at 1400° C. Thereafter, the melt is cooled to 1200° C. and is maintained at that temperature for 4 hours to convert the entire contents of the crucible to a highly crystalline mass containing barium disilicic fluormica ($BaMg_3(Al_2Si_2O_{10})F_2$) crystals as the predominant crystal phase. The crystallized melt is the mined from the crucible, crushed, and milled to provide a barium disilicic fluormica powder having an average particle size of about 10 microns.

Ceramic matrix composites are fabricated from glass powder batches comprising this mica powder and the aluminosilicate glass matrix powder of Examples 2-5, the mica powder being blended with the matrix powder in proportions of 5 and 10% by weight of mica additive, and the resulting powder mixtures being slurried with an aqueous vehicle as therein described. The same Nicalon silicon carbide fiber tows are used, and the same tow impregnation, burnout, layup, and final consolidation procedures are followed.

Testing of the ceramic matrix composite samples incorporating the barium disilicic fluormica matrix is carried as described above. Again, flexural tests in 4-point bending are conducted at ambient temperature and at 1000° C. and 1200° C., and data concerning the microcrack stress and strain performance and ultimate stress and strain values observed is tabulated.

Table III below sets forth the results of this testing for a group of samples containing an addition of 5% by weight of barium disilicic fluormica crystals to the anorthite glass-ceramic matrix. Included in Table III for each of the composite samples tested are data respecting the hot press temperature (HP Temp.) used for the consolidation of the composite and the test temperature (Flex. Test Temp.) at which each test is carried out. The values recorded for each of microcrack yield stress ($\sigma_{MCY}$) and strain ($\epsilon_{MCY}$) as well as ultimate stress ($\sigma_{ULT}$) and strain ($\epsilon_{ULT}$) are also reported.

TABLE III

| Example No./HP Temp. (°C.) | Flex Test Temp. (°C.) | 5% Disilicic Mica | | | |
|---|---|---|---|---|---|
| | | $\sigma_{MCY}$ (Ksi) | $\epsilon_{MCY}$ (%) | $\sigma_{ULT}$ (Ksi) | $\epsilon_{ULT}$ (%) |
| 6/ | 25 | 41 | 0.22 | 55 | 0.33 |
| 1200° | 1000 | 21 | 0.15 | 50 | 0.39 |
| | 1200 | 6.3 | 0.07 | 31 | 0.48 |
| 7/ | 25 | 31 | 0.18 | 98 | 0.84 |
| 1250° | 1000 | 13 | 0.10 | 55 | 0.51 |
| | 1200 | 6.4 | 0.08 | 39 | 0.70 |
| 8/ | 25 | 37 | 0.14 | 86 | 0.75 |
| 1300° | 1000 | 14 | 0.11 | 45 | 0.39 |
| | 1200 | 8.7 | 0.11 | 46 | 0.79 |

As seen from Table III, best results in terms of high temperature strength retention (resistance to fiber embrittlement) are achieved at consolidation temperatures of approximately 1250° C. However, significant improvements in ultimate 1200° C. strength and sample elongation over the results observed with the 5% tetrasilicic fluormica addition of Example 2 above are observed under all of the consolidation treatments attempted.

Corresponding flexural test results for composites comprising 10% by weight of barium disilicic fluormica added to the matrix are reported in Table IV below.

TABLE IV

| Example No./HP Temp. (°C.) | Flex Test Temp. (°C.) | 10% Disilicic Mica | | | |
|---|---|---|---|---|---|
| | | $\sigma_{MCY}$ (Ksi) | $\epsilon_{MCY}$ (%) | $\sigma_{ULT}$ (Ksi) | $\epsilon_{ULT}$ (%) |
| 9/ | 25 | 29 | 0.17 | 62 | 0.46 |
| 1200° | 1000 | 16 | 0.14 | 37 | 0.38 |
| | 1200 | 3 | 0.06 | 6.7 | 0.24 |
| 10/ | 25 | 62 | 0.30 | 91 | 0.54 |
| 1250° | 1000 | 25 | 0.18 | 92 | 0.72 |
| | 1200 | 13 | 0.13 | 67 | 0.83 |
| 11/ | 25 | 29 | 0.16 | 77 | 0.65 |
| 1300° | 1000 | 15 | 0.12 | 60 | 0.53 |
| | 1200 | 5.0 | 0.06 | 16 | 0.27 |

As is the case for the 5% mica additions to this matrix, best results in terms of high temperature (1200° C.) ultimate strength and strain tolerance from among the ceramic composites of Table IV are seen in the sample consolidated at 1250° C . In this case, however, better retention of 1000° C. stress and strain performance is observed. Most significantly, substantial improvements in performance as compared with the composite of Example 3, containing an equivalent weight addition of tetrasilicic mica instead of the more refractory disilicic mica, are seen.

As the foregoing data indicate, the addition of mica crystals to glass-ceramic matrices in accordance with the invention provides an excellent method for reducing the oxidation embrittlement of SiC-fiber-reinforced glass-ceramic matrix composites at elevated temperatures in oxidizing environments. Again, we postulate, without limitation as to mode of operation, that the effectiveness of this approach could perhaps involve crack deflection and branching within the matrix, facilitated by the randomly oriented weak cleavage planes of the mica crystals present, which thereby prevent or delay the exposure of fiber/matrix interface to embrittling oxidation effects. Quite evidently, such a mechanism would not be limited to silicon carbide fibers only, but would be operative in any fiber-reinforced ceramic matrix composite system comprising a functional fiber/matrix interface which could benefit from the oxidation protection thereby provided. Specific examples of such composites would include those comprising other than silicon carbide fibers, but wherein the fibers are provided with functional oxidizable coatings of carbon, carbides, or nitrides.

Therefore, while the invention has been particularly described above with respect to specific materials and specific procedures, it will be recognized that those materials and procedures are presented for purposes of illustration only and are not intended to be limiting. Thus numerous modifications and variations upon the compositions and processes specifically described herein may be resorted to by those skilled in the art within the scope of the appended claims.

We claim:

1. A ceramic matrix composite article comprising reinforcing fibers disposed within a ceramic matrix, characterized in that the ceramic matrix contains dispersed mica crystallites and in that the mica crystallites comprise not more than 20 percent by weight of the matrix.

2. A ceramic matrix composite article in accordance with claim 1 wherein the fibers are selected from the group consisting of silicon carbide fibers and silicon oxycarbide fibers.

3. A ceramic matrix composite article in accordance with claim 1 wherein the mica crystallites are of a synthetic fluormica and constitute 2-20% by weight of the matrix.

4. A ceramic matrix composite article in accordance with claim 3 wherein the mica crystallites are selected from the group consisting of potassium tetrasilicic, alkaline earth trisilicic, and alkaline earth disilicic fluormica crystallites.

5. A ceramic matrix composite article in accordance with claim 1 wherein the ceramic matrix is composed of a glass-ceramic.

6. A ceramic matrix composite article in accordance with claim 5 wherein the glass-ceramic is an alkaline earth aluminosilicate glass-ceramic.

7. A ceramic matrix composite article in accordance with claim 6 wherein the glass-ceramic comprises a principal crystal phase selected from the group consisting of cordierite, anorthite, mixed anorthite-alumina, mixed anorthite-cordierite, and stuffed cordierite.

8. A method for improving the high temperature oxidation resistance of a ceramic matrix composite article comprising reinforcing fibers disposed within a ceramic matrix which comprises the step of incorporating a dispersion of mica crystallites into the ceramic matrix in a proportion comprising 2-20 percent by weight of the matrix.

9. A method in accordance with claim 8 wherein the fibers are selected from the group consisting of silicon carbide fibers and silicon oxycarbide fibers.

10. A method in accordance with claim 8 wherein the mica crystallites are of a synthetic fluormica and constitute 5-20% by weight of the matrix.

11. A method in accordance with claim 10 wherein the mica crystallites are selected from the group consisting of potassium tetrasilicic, alkaline earth trisilicic, and alkaline earth disilicic fluormica crystallites.

12. A method in accordance with claim 8 wherein the ceramic matrix is composed of a glass-ceramic.

13. A method in accordance with claim 12 wherein the glass-ceramic is an alkaline earth aluminosilicate glass-ceramic.

14. A method in accordance with claim 13 wherein the glass-ceramic comprises a principal crystal phase selected from the group consisting of cordierite, anorthite, mixed anorthite-alumina, mixed anorthite-cordierite, and stuffed cordierite.

* * * * *